United States Patent
Kubo

(10) Patent No.: US 7,342,687 B2
(45) Date of Patent: Mar. 11, 2008

(54) IMAGE READING APPARATUS AND LIGHT SOURCE STABILITY DETERMINATION METHOD

(75) Inventor: Shinya Kubo, Shizuoka (JP)

(73) Assignee: NEC Corporation, Tokyo (JP)

( * ) Notice: Subject to any disclaimer, the term of this patent is extended or adjusted under 35 U.S.C. 154(b) by 1117 days.

(21) Appl. No.: 10/411,102

(22) Filed: Apr. 11, 2003

(65) Prior Publication Data
US 2003/0193700 A1 Oct. 16, 2003

(30) Foreign Application Priority Data
Apr. 12, 2002 (JP) ............... 2002-110914

(51) Int. Cl.
*H04N 1/40* (2006.01)
*H04N 1/46* (2006.01)

(52) U.S. Cl. ............... 358/3.01; 358/3.02; 358/515; 358/516

(58) Field of Classification Search ............... 358/3.01, 358/3.02, 515, 516, 517, 518, 521, 529; 382/169, 382/274
See application file for complete search history.

(56) References Cited

U.S. PATENT DOCUMENTS

| | | | | |
|---|---|---|---|---|
| 5,530,239 | A * | 6/1996 | Konishi et al. | 250/208.1 |
| 6,989,917 | B2 * | 1/2006 | Honbo | 358/475 |
| 7,102,787 | B2 * | 9/2006 | Tamamura | 358/3.01 |
| 2001/0031093 | A1 * | 10/2001 | Fujiwara et al. | 382/240 |
| 2003/0072040 | A1 * | 4/2003 | Okamura | 358/474 |
| 2004/0263915 | A1 * | 12/2004 | Park | 358/461 |

FOREIGN PATENT DOCUMENTS

| | | |
|---|---|---|
| JP | H02-312355 A | 12/1990 |
| JP | 3-297266 A | 12/1991 |
| JP | 6-348824 A | 12/1994 |
| JP | 11-87675 A | 3/1999 |
| JP | 2000-151934 A | 5/2000 |
| JP | 2000-287035 A | 10/2000 |
| JP | 2000-349989 A | 12/2000 |
| JP | 2001-127962 A | 5/2001 |

* cited by examiner

*Primary Examiner*—Houshang Safaipour
(74) *Attorney, Agent, or Firm*—Sughrue Mion, PLLC

(57) ABSTRACT

A scanner has an imaging device which is constituted by a cold-cathode tube, includes a light source for irradiating light to a reflection surface of a reference white plate and a plurality of pixels arranged in one line, and detects light reflected on the reflection surface by the respective pixels, and has a light source stability determination unit which determines whether or not light amounts obtained by the one line of pixels from the light source are approximately uniform. Only in a case where the light source stability determination unit determines that the light amounts obtained by the one line of pixels from the light source are approximately uniform, the scanner reads the reference white plate to calculate correction values for the respective pixels and reads a manuscript.

8 Claims, 7 Drawing Sheets

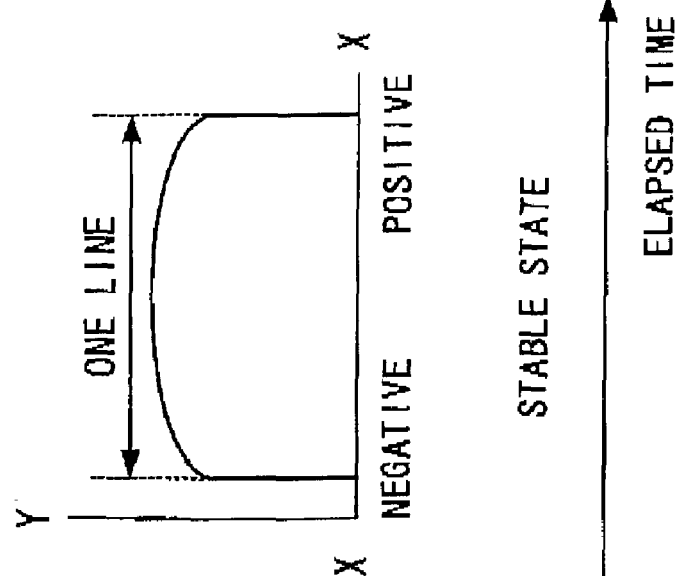
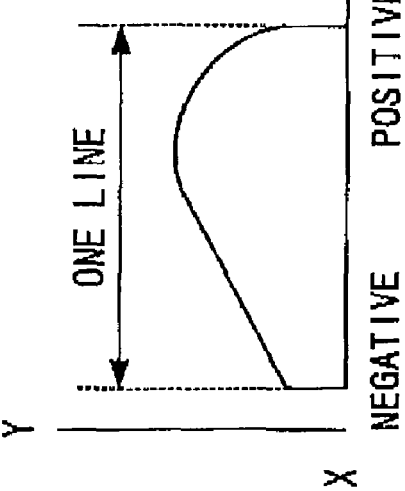
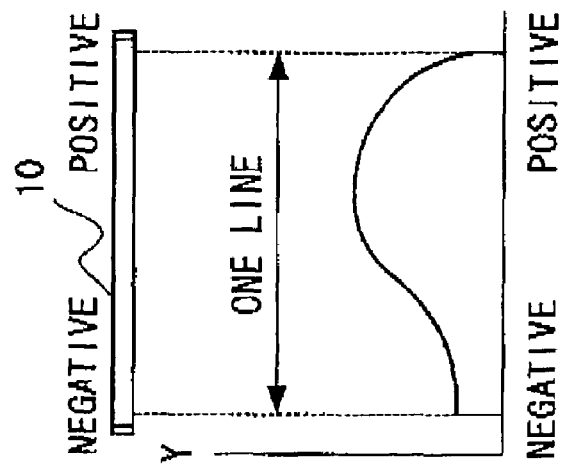

IMAGE READING APPARATUS AND LIGHT SOURCE STABILITY DETERMINATION METHOD

BACKGROUND OF THE INVENTION

1. Field of the Invention

The present invention relates to an image reading apparatus and a light source stability determination method.

2. Description of the Related Art

An image reading apparatus such as a scanner or fax, uses a light source to irradiates light to a manuscript, uses an imaging device to detect amount of light reflected on the manuscript by respective pixels of the imaging device, and generates image signals based on the amount of the light that the respective pixels. In general, the image reading apparatus uses a cold-cathode tube as a light source.

However, a cold-cathode tube has a characteristic that a predetermined period of time, from the time it starts lightning until the time the amount of light it generates becomes stable, is relatively long. In another word, the cold-cathode tube has a characteristic that a period of time that amount of the light obtained from the entire cold-cathode tube becomes even, is relatively long. Accordingly, conventional image reading apparatuses using a cold-cathode tube as a light source stabilize the cold-cathode tube in various ways.

For example, an image reading apparatus disclosed in Unexamined Japanese Patent Application KOKAI Publication No. H3-297266 stabilizes the cold-cathode tube by controlling turning on and turning off of the cold-cathode tube.

An image reading apparatus disclosed in Unexamined Japanese Patent Application KOKAI Publication No. 2001-127962 controls a tube current of the cold-cathode tube by monitoring the temperature of the cold-cathode tube, thereby obtains a stable light amount.

Further, an image reading apparatus disclosed in Unexamined Japanese Patent Application KOKAI Publication No. 2000-287035 shortens the period of time needed from the time the cold-cathode tube is turned on until the time the generated light amount becomes stable, by flowing a large current through the cold-cathode tube immediately after the tube is turned on.

In addition, image reading apparatuses of these kinds prevents decreasing the precision for scanning by various methods.

For example, an image reading apparatus disclosed in Unexamined Japanese Patent Application KOKAI Publication No. H6-348824 monitors a light amount obtained from a part of a cold-cathode tube, and scans an image when the light amount from this part becomes stable.

Decrement of the quality of the scanned image is attributed not only to unstableness of the light amount obtained from the entire cold-cathode tube, but also to irregularity in the light receiving precision of pixels included in an imaging device. Thus, some image reading includes an imaging device whose pixels having fine light receiving efficiency, such as one disclosed in Unexamined Japanese Patent Application KOKAI Publication No. H11-87675.

Further, some other image reading apparatuses, such as one disclosed in Unexamined Japanese Patent Application KOKAI Publication No. 2000-151934, correct quality of the scanned image by shading correction.

The disclosures of the above-indicated documents are incorporated herein by reference.

An image reading apparatus, which performs shading correction, usually scans a reference white plate having a reflection surface whose reflection ratio is almost uniform by using an imaging device, after a cold-cathode tube starts lighting and before image reading is started. The image reading apparatus generates electric signals (white color image signals) having signal levels (white color image densities) corresponding to the amounts of light detected by the respective pixels of the imaging device by scanning, and calculates correction values from the electric signals. Then, the image reading apparatus performs shading correction by using the correction values.

In some case, conventional image reading apparatuses scan the reference white plate to calculate the correction values undesirably when the cold-cathode tube is not stable enough, i.e., when the light amount obtained from the entire cold-cathode tube is uneven. In such a case, the image reading apparatus can not calculate proper correction values, perform shading correction properly neither. Therefore, precision of correcting image is decrease.

SUMMARY OF THE INTENTION

The present invention was made in view of the above circumstances, and an object of the present invention is to provide an image reading apparatus and a light source stability determination method for preventing a decrease in image correction precision.

To solve the above-described problem, a light source stability determination method according to a first aspect of the present invention is a method which is applied to an image reading apparatus in which an imaging device formed by pixels arranged in one line detects light reflected on a white reflection surface having a uniform reflection ratio by the respective pixels, white correction values are calculated for the respective pixels based on amounts of the detected light, the imaging device detects light reflected on a manuscript by the respective pixels and generates first electric signals having signal levels corresponding to amounts of the detected light, and the signal levels of the first electric signals generated from the respective pixels are corrected by the correction values, the method comprising: irradiating light to the reflection surface from a light source constituted by a cold-cathode tube; detecting light reflected on the reflection surface by the respective pixels of the imaging device; determining whether or not a light amount obtained by the one line of pixels from the light source is within a predetermined range, based on light amounts detected by the respective elements; and starting calculation of the correction values, generation of the first electric signals, and correction of the signal levels of the first electric signals with the use of the correction values, in a case where it is determined that the light amount obtained by the one line of pixels from the light source is within the predetermined range.

By employing such a light source stability determination method, an image reading apparatus can determine whether or not a light amount obtained by one line of pixels from a light source is within a predetermined range. Only in a case where determining that the light amount obtained by the one line of pixels from the light source is within the predetermined range, the image reading apparatus reads the reflection surface to calculate correction values, and performs image reading. Therefore, the image reading apparatus can prevent a decrease in the correction precision due to unevenness in the light amount obtained from the light source.

The light source stability determination method may further comprise: generating second electric signals having signal levels corresponding to the light amounts reflected on the reflection surface and detected by the respective pixels; generating waveform data representing the signal levels of the second electric signals corresponding to the one line of pixels; determining whether or not there is a distortion in the waveform data corresponding to the one line of pixels; determining that the light amount obtained by the one line of pixels from the light source is within the predetermined range, in a case where it is determined that there is no distortion in the waveform data.

The light source stability determination method may further comprise: selecting from the one line of pixels of the imaging device, a first pixel positioned at one end of the imaging device, a second pixel positioned at the other end of the imaging device, and a third pixel positioned in the middle between the first pixel and the second pixel; further selecting a fourth pixel between the third pixel and the first pixel that is away from the third pixel by a predetermined distance, and a fifth pixel between the third pixel and the second pixel that is away from the third pixel by the same distance as that between the third pixel and the fourth pixel; specifying a signal level corresponding to a light amount detected by the fourth pixel and a signal level corresponding to a light amount detected by the fifth pixel from the waveform data; and determining whether or not there is a distortion in the waveform data by deriving a difference between the signal level corresponding to the light amount detected by the fourth pixel and the signal level corresponding to the light amount detected by the fifth pixel. The light source stability determination method may further comprise determining that the light amount obtained by the one line of pixels from the light source is within the predetermined range, in a case where the difference between the signal level corresponding to the light amount detected by the fourth pixel and the signal level corresponding to the light amount detected by the fifth pixel is less than k times of the signal level corresponding to the light amount detected by the fourth or fifth pixel (k being a real number satisfying a relationship 0<k<1).

The light source stability determination method may further comprise determining that there is a distortion in the waveform data, in a case where a signal level corresponding to a light amount detected by the third pixel is larger than one of the signal levels corresponding to the light amounts detected by the fourth and fifth pixels and is smaller than the other of the signal levels corresponding to the light amounts detected by the fourth and fifth pixels.

The light source stability determination method may further comprise: detecting light reflected on the reflection surface by the respective pixels of the imaging device when a predetermined period of time passes after the light source starts lighting, and generating third electric signals having signal levels corresponding to detected light amounts; generating waveform data representing the signal levels of the third electric signals corresponding to the one line of pixels; specifying signal levels of the second electric signals obtained from predetermined pixels and signal levels of the third electric signals obtained from the same predetermined pixels, respectively from the waveform data of the second electric signals and the waveform data of the third electric signals; and determining that the light amount obtained by the one line of pixels from the light source is within the predetermined range, in a case where differences between the specified signal levels of the second electric signals and the specified signal levels of the third electric signals are equal to or less than a predetermined threshold value.

To solve the above-described problem, an image reading apparatus according to a second aspect of the present invention is an apparatus in which an imaging device formed by pixels arranged in one line detects light reflected on a white reflection surface having a uniform reflection ratio by the respective pixels, white correction values are calculated for the respective pixels based on amounts of the detected light, the imaging device detects light reflected on a manuscript by the respective pixels and generates first electric signals having signal levels corresponding to amounts of the detected light, and the signal levels of the first electric signals generated from the respective pixels are corrected by the correction values, the apparatus comprising: a light source which is constituted by a cold-cathode tube, and irradiates light to the reflection surface; an imaging device which includes a plurality of pixels arranged in one line, and detects light reflected on the reflection surface by the respective pixels; and a light source stability determination unit which determines whether or not a light amount obtained by the one line of pixels from the light source is within a predetermined range, based on light amounts detected by the respective pixels.

By employing such a structure, an image reading apparatus can determine whether or not a light amount obtained by one line of pixels from a light source is within a predetermined range. Therefore, the image reading apparatus can determine whether or not the light amount obtained from the entire light source is uniform, i.e., whether or not the light source is in a stable state. Due to this, the image reading apparatus can obtain white color image densities having no unevenness by reading the reflection surface while the light source is in a stable state. Accordingly, the image reading apparatus can prevent a decrease in the image correction precision due to unevenness in the white color image densities.

In a case where the light source stability determination unit determines that the light amount obtained by the one line of pixel from the light source is within the predetermined range, the image reading apparatus starts calculation of the correction values, generation of the first electric signal, and correction of the first electric signals with the use of the correction values.

The image reading apparatus may further comprise an image processing unit which calculates the correction values, and corrects the signal levels of the first electric signals obtained from the respective pixels, with the use of the calculated correction values, the imaging device may generate second electric signals having signal levels corresponding to the light amounts reflected on the reflection surface and detected by the respective pixels; the image processing unit may generate waveform data of the second electric signals corresponding to the one line of pixels; and the light source stability determination unit may determine whether or not the light amount obtained from the light source is within the predetermined range, based on the waveform data corresponding to the one line of pixels.

The imaging device may detect light reflected on the reflection surface by the respective pixels, and generate third electric signals having signal levels corresponding to detected light amounts, when a predetermined period of time passes after the light source starts lighting, the image processing unit may generate waveform data representing the signal levels of the third electric signals corresponding to the one line of pixels, and the light source stability determination unit may determine that the light amount obtained by the one line of pixels from the light source is within the predetermined range, in a case where differences between signal levels of the second electric signals obtained from predetermined pixels and signal levels of the third electric signals obtained from the same predetermined pixels are determined to be equal to or less than a predetermined threshold value by referring to the waveform data of the second electric signals and the waveform data of the third electric signals.

The light source stability determination unit may select from the one line of pixels of the imaging device, a first pixel positioned at one end of the imaging device, a second pixel positioned at the other end of the imaging device, and a third pixel positioned in the middle between the first pixel and the second pixel in the waveform data of the third electric signals, may further select a fourth pixel between the third pixel and the first pixel that is away from the third pixel by a predetermined distance, and a fifth pixel between the third pixel and the second pixel that is away from the third pixel by the same distance as that between the third pixel and the fourth pixel, may specify a signal level corresponding to a light amount detected by the fourth pixel and a signal level corresponding to a light amount detected by the fifth pixel, and may determine that the light amount obtained by the one line of pixels of the imaging device from the light source is within the predetermined range, in a case where a difference between the signal level corresponding to the light amount detected by the fourth pixel and the signal level corresponding to the light amount detected by the fifth pixel is less than a predetermined threshold value.

BRIEF DESCRIPTION OF THE DRAWINGS

These objects and other objects and advantages of the present invention will become more apparent upon reading of the following detailed description and the accompanying drawings in which:

FIGS. 5A and 5B are waveform charts representing signal levels of white color image signals obtained when a light source is in an unstable state in the image reading apparatus shown in FIG. 1, and FIG. 5C is a waveform chart representing signal levels of white color image signals obtained when the light source is in a stable state in the image reading apparatus shown in FIG. 1;

DETAILED DESCRIPTION OF THE PREFERRED EMBODIMENTS

An image reading apparatus and a light source stability determination method according to the embodiments of the present invention will now be explained with reference to the drawings, by employing a flat head type scanner which corrects the shading of a read image as an example.

First Embodiment

Figure 1:
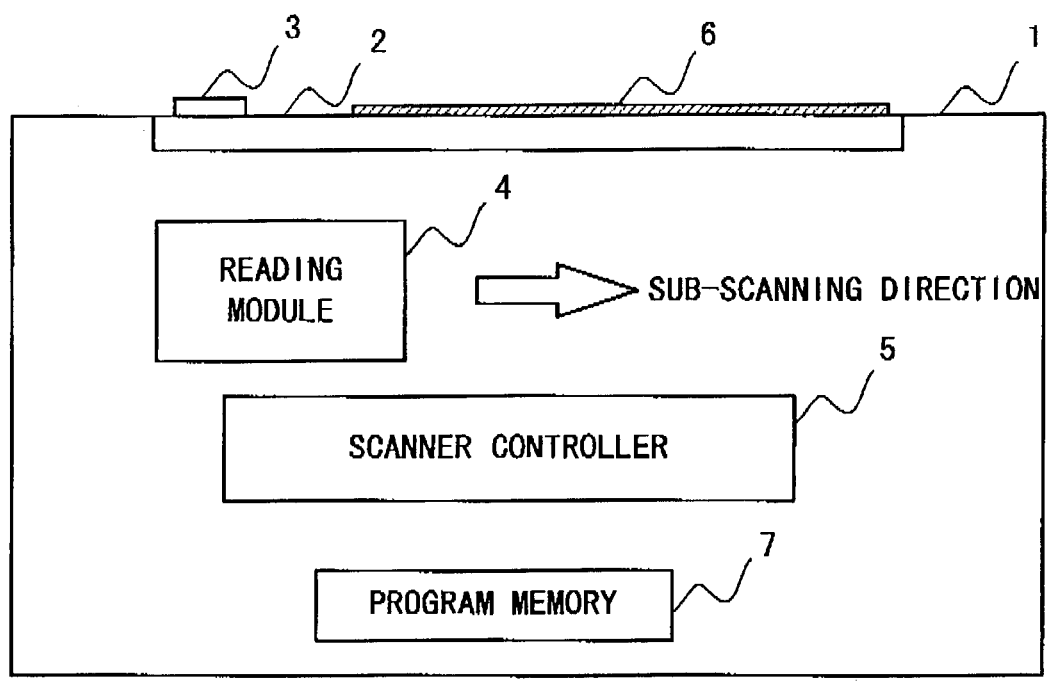
FIG. 1 is a block diagram showing a structure of an image reading apparatus according to a first embodiment of the present invention.

As shown in FIG. 1, a scanner 1 according to the first embodiment comprises a reading glass 2, a reference white plate 3, a reading module 4, a scanner controller 5, and a program memory 7.

The reading glass 2 is provided upon a predetermined surface of the scanner 1. A manuscript 6 which is the image reading target is placed on one surface of the reading glass 2. The reference white plate 3 is placed at a predetermined position of one surface of the reading glass 2.

The reference white plate 3 is used for obtaining "white color" image densities for correction-use, and has a reflection surface whose reflection ratio is almost uniform.

Figure 2:
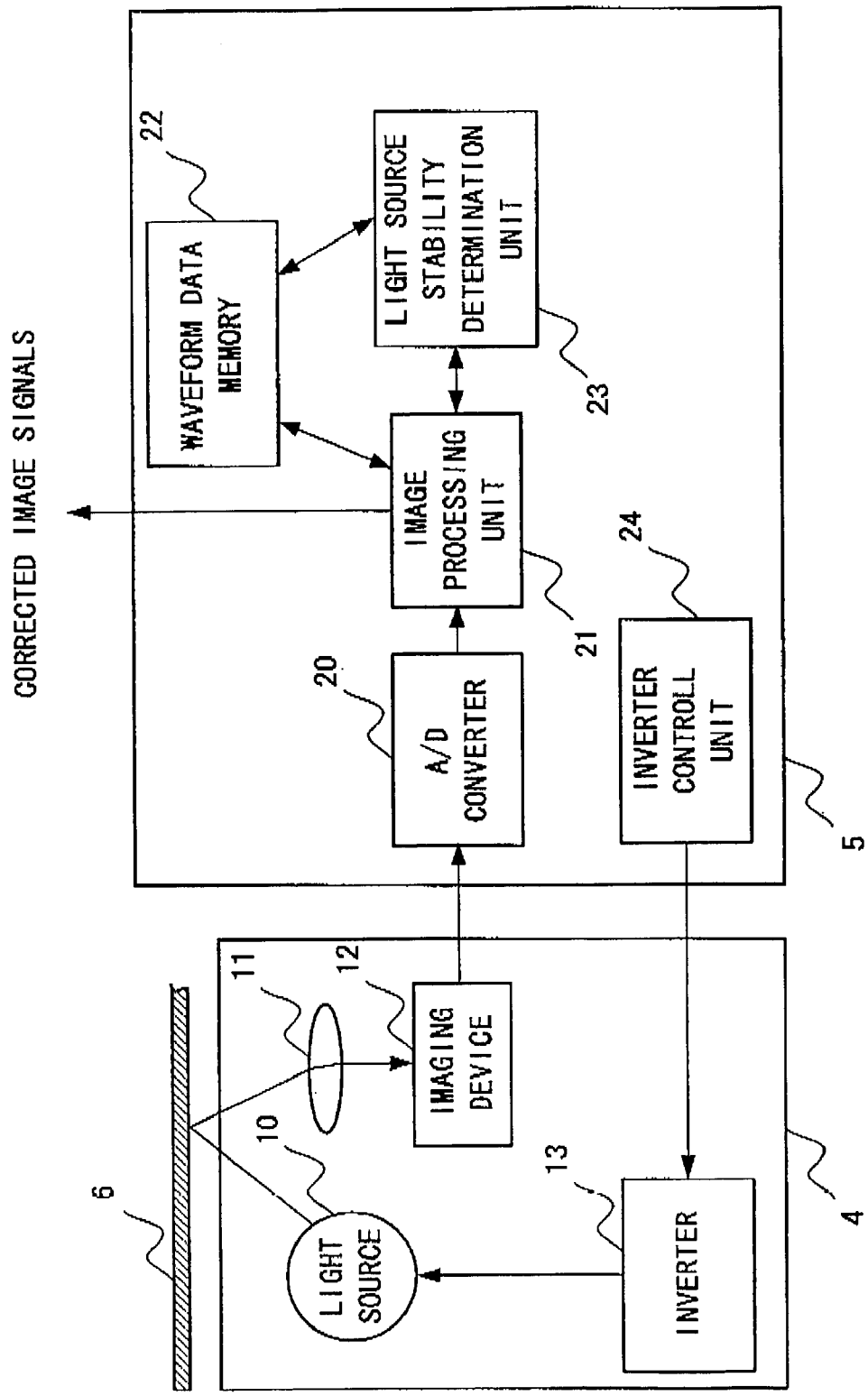
FIG. 2 is a block diagram showing structures of a reading module and a scanner controller shown in FIG. 1.

As shown in FIG. 2, the reading module 4 includes a light source 10, a lens 11, an imaging device 12, and an inverter 13.

Figure 3:
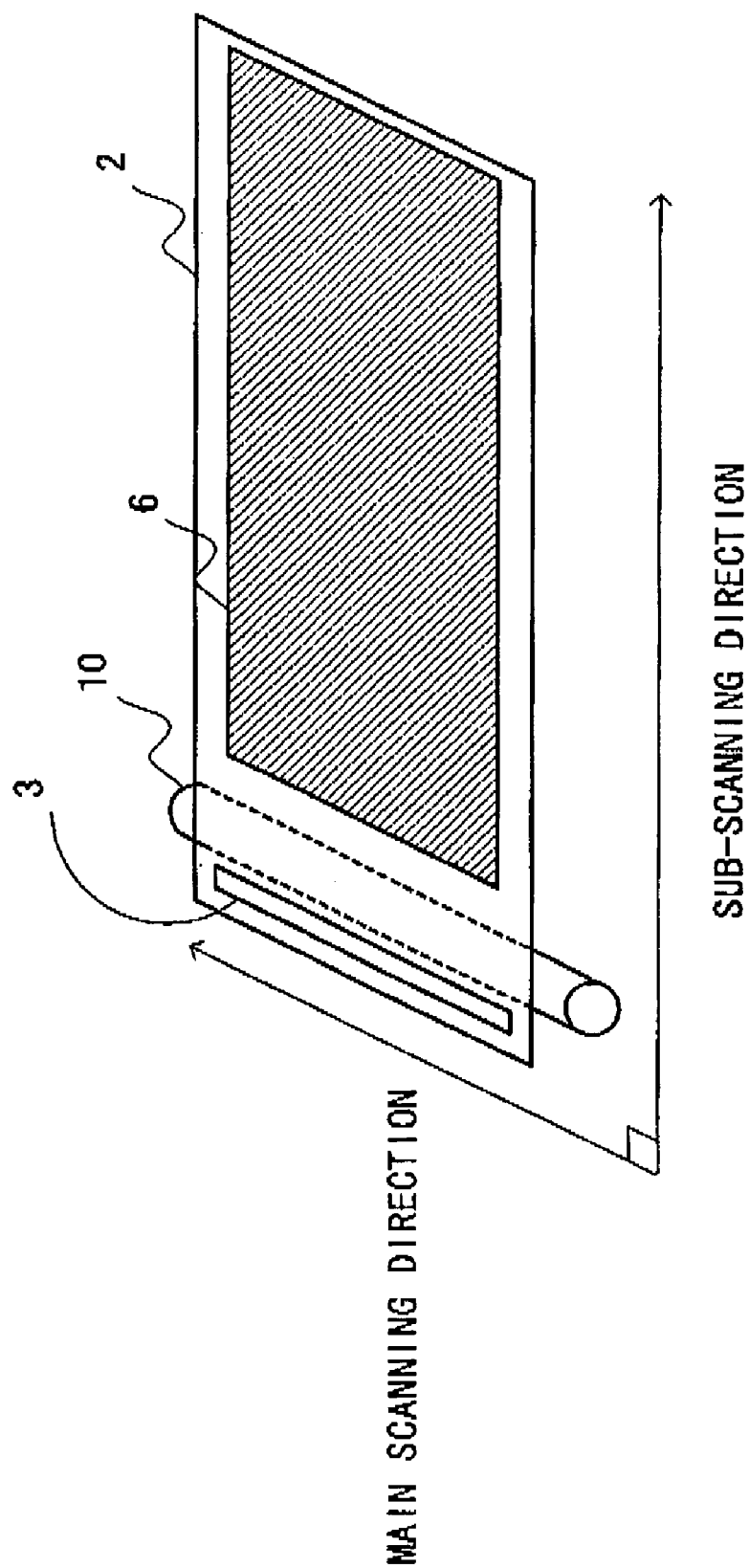
FIG. 3 is a diagram for explaining positional relationship among the structural elements of the reading module shown in FIG. 1.
Figure 4:
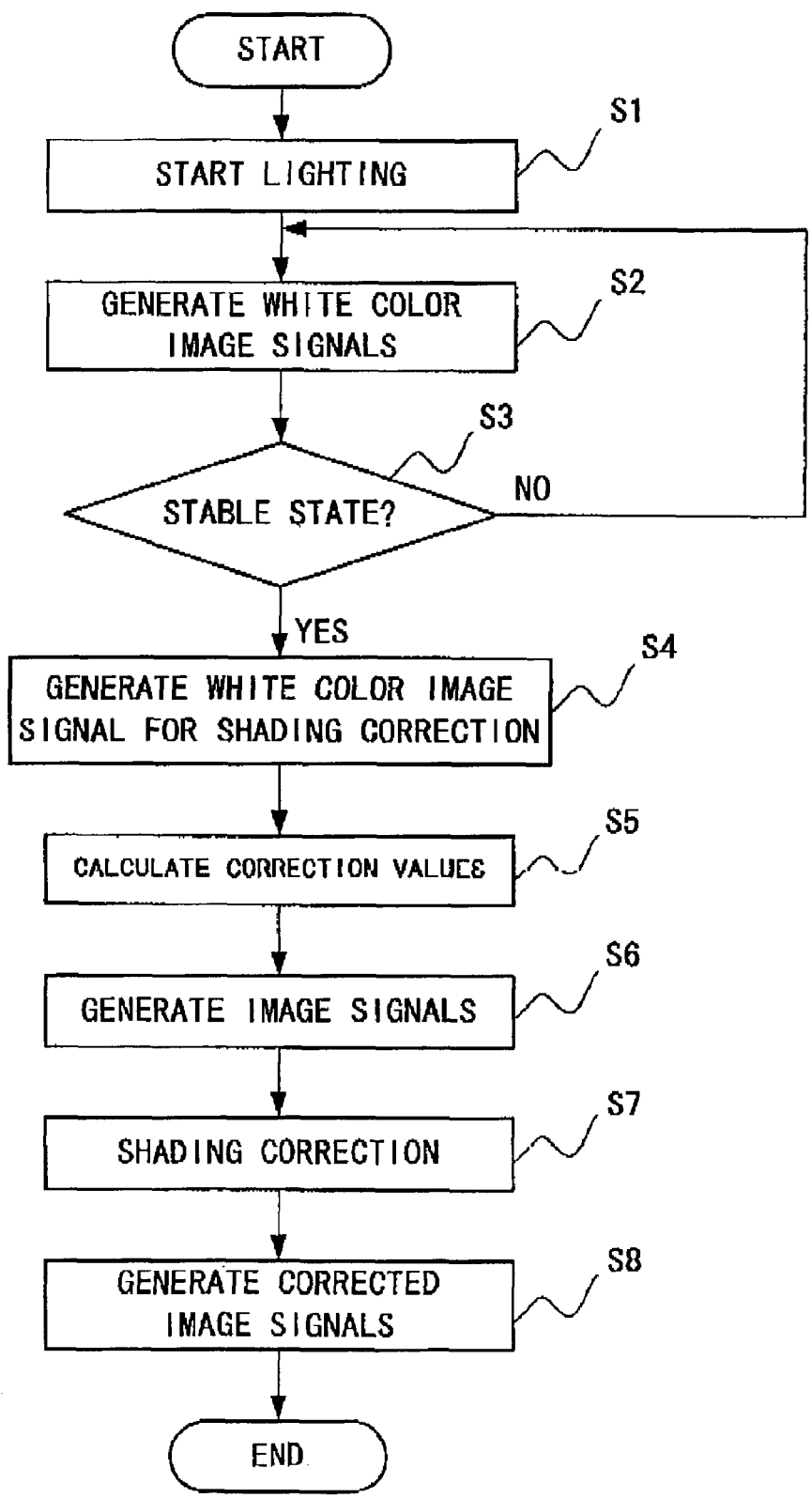
FIG. 4 is a flowchart for explaining an operation of the image reading apparatus shown in FIG. 1.

The light source 10 is constituted by, for example, a linear cold-cathode tube, and irradiates light to the manuscript 6 via the reading glass 2. As shown in FIG. 3, the light source 10 is arranged almost in parallel with a line segment in a main scanning direction (main scanning line), and almost perpendicular to a line segment in a sub-scanning direction (sub-scanning line) which perpendicularly intersects with the line segment in the main scanning direction.

The lens 11 shown in FIG. 2 focuses a light which is irradiated from the light source 10, reflected on the reflection surface of the reference white plate 3, and further reflected on a reflection mirror (not illustrated), toward the imaging device 12. Besides, the lens 11 focuses a light which is irradiated from the light source 10, reflected on the reading surface of the manuscript 6, and then reflected on the reflection mirror, toward the imaging device 12.

The imaging device 12 is constituted by, for example, a one-dimensional CCD (Charge Coupled Device) formed by a plurality of pixels arranged in line. The direction in which the pixels of the imaging device 12 are arranged corresponds to the main scanning direction. The imaging device 12 detects the amount of light (light amount) reflected on the reflection surface of the reference white plate 3 and on the reading surface of the manuscript 6 by the respective pixels, and generates electric signals having signal levels (image densities) corresponding to the detected light amount. The imaging device 12 outputs the electric signals to a later-described A/D converter 20 included in the scanner controller 5.

The inverter 13 is connected to a power source (not illustrated), and supplies power to the light source 10 in accordance with an instruction from a later-described inverter control circuit included in the scanner controller 5.

The reading module 4 having the above-described structure scans the image of the manuscript 6 by each main scanning line (a line parallel with the main scanning direction and corresponding to one line of pixels of the imaging device 12, hereinafter referred to as "line") by the imaging device 12, while moving in the sub-scanning direction shown in FIG. 1 and FIG. 3, with the use of a motor, etc. (not shown) of the scanner 1. The reading module 4 faces the reference white plate 3 via the reading glass 2 when it is in its home position, and scans the reflection surface of the reference white plate 3 by the imaging device 12. The detailed operation of the reading module 4 will be described later.

The scanner controller 5 shown in FIG. 1 includes an A/D converter 20, an image processing unit 21, a waveform data memory 22, a light source stability determination unit 23, and an inverter control unit 24, as shown in FIG. 2.

The A/D converter 20 digitizes electric signals output from the imaging device 12 by a predetermined quantization bit number, and outputs the digitized electric signals to the image processing unit 21.

The image processing unit 21 generates waveform data indicative of the signal levels of the digitized electric signals, for one line of pixels of the imaging device 12 (i.e., for one line), and stores the waveform data in the waveform data memory 22. The image processing unit 21 calculates correction values for the respective pixels of the imaging device 12, from the electric signals obtained by scanning of the reference white plate 3 performed by the imaging device 12. The image processing unit 21 stores the calculated correction values in a correction value memory (not illustrated) in association with the addresses of the respective pixels. Further, the image processing unit 21 electrically applies shading correction to digital electric signals obtained by scanning of the image of the manuscript 6 performed by the imaging device 12.

Since the shading correction is well-known to those skilled in the art, detailed explanation thereof will be omitted herein.

The waveform data memory 22 stores waveform data representing signal levels of electric signals for one line.

The light source stability determination unit 23 determines whether or not the light source 10 is in a stable state, by determining whether or not there is any distortion in the waveform data. In other words, the light source stability determination unit 23 determines whether or not the light amount obtained by one line of pixels from the light source 10 is within a tolerable range, based on light amounts detected by the respective pixels of the imaging device 12.

The inverter control unit 24 controls power supply from the inverter 13 to the light source 10.

The program memory 7 shown in FIG. 1 is constituted by a ROM (Read Only Memory), a RAM (Random Access Memory), etc., and stores a computer program. Each structural element of the scanner 1, such as the reading module 4, the scanner controller 5, etc. operates in accordance with the computer program.

Next, the operation of the scanner 1 having the above-described structure will be explained with reference to the drawings. First, with reference to FIGS. 1 to 4, the operation of the structural elements of the scanner 1 will be schematically explained.

A user of the scanner 1 places the manuscript 6 onto one surface of the reading glass 2 when the user wants to scan the image of the manuscript 6. And the user turns on a power source switch (not illustrated) of the scanner 1. Thereby, the structural elements of the scanner 1 start the following operation.

The inverter control unit 24 of the scanner controller 5 instructs the inverter 13 to start power supply to the light source 10. The inverter 13 supplies power to the light source 10 in accordance with the instruction. Due to the power supply from the inverter 13, the light source 10 starts lighting (step S1). The light source 10 irradiates light to the reflection surface of the reference white plate 3 to which the reading module 4 is opposed in its home position.

The imaging device 12 of the reading module 4 detects amount of the light reflected on the reference white plate 3 by the respective pixels, and generates electric signals (white color image signals) having signal levels corresponding to the detected light amount at respective pixels (step S2). Then, the imaging device 12 sends the white color image signals to the A/D converter 20.

The A/D converter 20 receives and digitizes the white color image signals. Then, the A/D converter 20 sends the digitized white color image signals to the image processing unit 21.

The image processing unit 21 receives the white color image signals sent from the A/D converter 20. The image processing unit 21 generates waveform data representing the signal levels of the white color image signals corresponding to one line of pixels, and stores the waveform data in the waveform data memory 22.

When the image processing unit 21 completes storing of the waveform data, it notifies the light source stability determination unit 23 of the fact that the data storage is completed.

In response to this notification, the light source stability determination unit 23 reads out the waveform data representing the signal levels of the white color image signals from the waveform data memory 22. The light source stability determination unit 23 determines whether or not the light amount obtained by one line of pixels of the imaging device 12 from the light source 10 is within a tolerable range, and thereby determines whether or not the light source 10 is in a stable state (step S3).

In a case where determining that the light source 10 is in a stable state (step S3; Yes), the light source stability determination unit 23 notifies the image processing unit 21 of this determination result. The light source stability determination unit 23 stores the waveform data in the waveform data memory 22.

The reading module 4 of the scanner 1 reads the reference white plate 3 again in response to the notification from the light source stability determination unit 23 to the image processing unit 21, and obtains white color image densities for shading correction.

Specifically, in the image reading module 4, the imaging device 12 detects the amount of light (light amount) reflected on the reference white plate 3 by the respective pixels, generates white color image signals having signal levels corresponding to the detected light amount (step S4), and outputs the signals to the A/D converter 20. In the scanner controller 5, the A/D converter 20 digitizes the white color image signals, and outputs the signals to the image processing unit 21.

The image processing unit 21 calculates the correction values for the respective pixels based on the white color image signals from the respective signals of the imaging device 12 (step S5). The image processing unit 21 stores the correction values of the respective pixels in association with the addresses of the respective pixels in the correction value memory (not illustrated).

When storing of the correction value of each pixel is completed, the image processing unit 21 moves the reading module 4 from its home position in the sub-scanning direction at a predetermined velocity by using a motor, etc., (not illustrated) of the scanner 1. The reading module 4 scans the image of the manuscript 6 by using its structural elements while moving in the sub-scanning direction.

More specifically, the light source 10 of the reading module 4 irradiates light to the manuscript 6, and the imaging device 12 receives light reflected on the manuscript 6 and guided by the lens 11. The imaging device 12 generates electric signals (image signals) based on the amount of received light (step S6), and outputs the signals to the A/D converter 20. The A/D converter 20 digitizes the image signals, and sends them to the image processing unit 21. The image processing unit 21 receives the digitized image signals.

The image processing unit 21 reads out the correction values for the respective pixels from the correction value memory. Then, the image processing unit 21 applies shading correction to the image signals by the read-out correction values (step S7), thus generates the corrected image signals (step S8).

The structural elements of the reading module 4 and scanner controller 5 repeat this operation line by line, until the full image of the manuscript 6 is completely scanned.

In a case where the light source stability determination unit 23 determines in step S3 that the light source 10 is not in a stable state (step S3; No), it instructs the image processing unit 21 to store waveform data representing signal levels of white color image signals sent from the A/D converter 20 after a predetermined time standing by, in the waveform data memory 22. Due to this, the operation of the scanner 1 returns to step S2.

After the predetermined time standing by, the image processing unit 21 receives white color image signals from the A/D converter 20. Then, the image processing unit 21 generates waveform data representing the signal levels of the received white color image signals, and stores the generated data in the waveform data memory 22. When storing of the waveform data is completed, the image processing unit 21 notifies the fact to the light source stability determination unit 23.

In response-to this notification, the light source stability determination unit 23 reads out the waveform data from the waveform data memory 22, and determines again whether or not the light source 10 is in a stable state. In a case where the light source stability determination unit 23 determines that the light source 10 is in a stable state, the operation of the scanner 1 goes to step S4 in response to this determination result. On the contrary, in a case where the light source stability determination unit 23 determines that the light source 10 is not in a stable state, the operation of the scanner 1 returns to step S2.

The structural elements of the scanner 1 repeat this operation until the light source stability determination unit 23 determines that the light source 10 is in a stable state.

Next, among the above-described operations of the structural elements of the scanner 1, the determination operation by the light source stability determination unit 23 will be explained in detail with reference to FIGS. 5A to 5C and FIGS. 6A to 6B.

FIGS. 5A to 5C and FIGS. 6A to 6B show waveforms of digitized white color image signals, for one line. The X axis shown in theses drawings represents positions of the pixels of the imaging device 12, and Y axis represents the signal levels of white color image signals corresponding to amounts of the light detected by the respective pixels.

Since mercury, etc. are not uniformly distributed in the light source 10 immediately after the cold-cathode tube (light source 10) starts lighting, illuminance of a portion near the positive electrode of the light source 10 and illuminance of a portion near the negative electrode of the light source 10 are not uniform. Therefore, if the light source 10 is not in a stable state, there occurs a difference in the light amounts detected by a plurality of pixels corresponding to the portion near the positive electrode of the light source 10 and by a plurality of pixels corresponding to the portion near the negative electrode of the light source 10. Accordingly, the waveform of one line of white color image signals having signal levels (image densities) corresponding to the light amounts detected by the respective pixels has a distortion, as shown in FIG. 5A.

Distribution of the mercury, etc. in the light source 10 gradually becomes uniform as time elapses from the start of lighting. Therefore, the difference between the light amount obtained from the portion near the positive electrode of the light source 10 and the light amount obtained from the portion near the negative electrode of the light source 10 decreases over time. Accordingly, the difference between the light amount detected by the plurality of pixels corresponding to the portion near the positive electrode of the light source 10 and the light amount detected by the plurality of pixels corresponding to the portion near the negative electrode of the light source 10 gradually decreases. However, at this stage, the waveform of one line of white color image signals having signal levels corresponding to the light amounts detected by the respective pixels is not uniform yet, as shown in FIG. 5B.

Distribution of the mercury, etc. in the light source 10 finally becomes substantially uniform when a predetermined time elapses from the start of lighting. Therefore, the difference between the light amount obtained from the portion near the positive electrode of the light source 10 and the light amount obtained from the portion near the negative electrode of the light source 10 substantially disappears. Accordingly, there is substantially no difference in the light amounts detected by one line of pixels respectively, and thus the waveform of one line of white color image signals does not substantially have a distortion, as shown in FIG. 5C.

As explained above, the white color image signals have a distorted waveform if the light amounts obtained from the light source 10 are unstable, while the white color image signals have a normal waveform if the light amounts obtained from the light source 10 are stable. Thus, the light source stability determination unit 23 can determine whether or not the light source 10 is in a stable state, by determining whether or not there is a distortion in the waveform of one line of white color image signals.

Next, a determination method applied for the light source stability determination unit 23 to determine whether or not there is a distortion in the waveform of one line of white color image signals, will be specifically explained with reference to FIGS. 6A and 6B. The determination method to be explained below is one example, thus any other method may replace this determination method as long as the same determination results can be obtained.

Figure 6A:
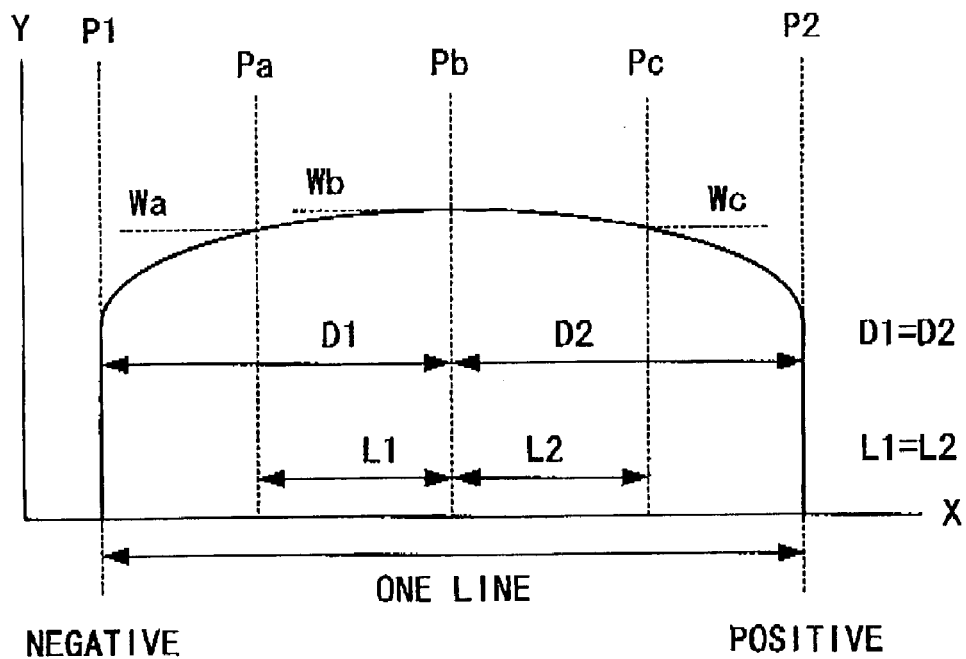
FIGS. 6A and 6B are waveform diagrams for explaining a determination operation performed by a light source stability determination unit shown in FIG. 2.
Figure 6B:
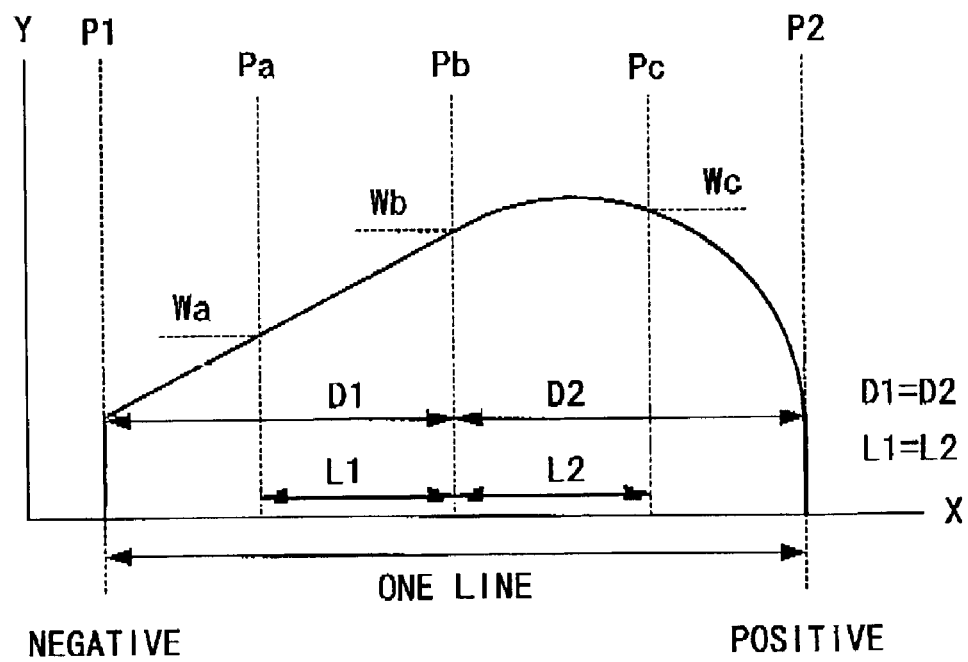

According to this determination method, in the waveform of one line of white color image signals, a pixel corresponding to the start point of one line (a pixel near the negative electrode of the light source 10) is assumed to be P1, as shown in FIGS. 6A and 6B. Further, a pixel corresponding to the end point of one line (a pixel near the positive electrode of the light source 10) is assumed to be P2.

A pixel corresponding to the middle point between P1 and P2 is assumed to be Pb. Accordingly, a distance D1 between P1 and Pb and a distance D2 between P2 and Pb are equal to each other.

The position of an arbitrary pixel existing between Pb and P1 is assumed to be Pa, and the position of an arbitrary pixel existing between Pb and P2 is assumed to be Pc. Notice that a distance L1 between Pb and Pa and a distance L2 between Pb and Pc are equal to each other.

The signal levels of white color image signals corresponding to light amounts detected respectively by the pixels Pa, Pb, and Pc are assumed to be Wa, Wb, and Wc.

In a case where the light source 10 is in an unstable state, the light amount obtained from the portion near the negative electrode of the light source 10 is smaller than the light amount obtained from the portion near the positive electrode of the light source 10. And a larger light amount is obtained from a portion near to the positive electrode of the light source 10 than from a portion nearer to the negative electrode of the light source 10. Accordingly, a relationship Wa<Wb<Wc can be established among the signal levels Wa, Wb, and Wc.

On the other hand, in a case where the light source 10 is in a stable state, there is substantially no difference between the light amounts obtained from the portion near the negative electrode of the light source 10 and the portion near the positive electrode of the light source 10. Therefore, relationships Wb>Wb, Wb>Wc, and Wa≈Wc are established among the signal levels Wa, Wb, and Wc.

Accordingly, in a case where either of a determination formula 1 and a determination formula 2 applies to the waveform of one line of white color image signals, the light source stability determination unit 23 can determine that the light source 10 is not in a stable state. The light source stability determination unit 23 determine that the light amount obtained by the one line of pixels from the light source 10 is not within a predetermined (tolerable) range, and the light source 10 is not in a stable state, in a case where the determination formula 1 and the determination formula 2 both apply to the waveform of one line of white color image signals.

[Determination Formula 1]

Wa<Wb<Wc

[Determination Formula 2]

Wa<kWc (k being an arbitrary constant satisfying a relationship, 0<k<1)

For example, if the light source stability determination unit 23 must determine that there is almost no distortion in the waveform of one line of white color image signals in a case where the difference between Wa and Wc is less than 20% of the value of Wc, the value of the constant k should be 0.8. The value of the constant k should be arbitrarily set based on the characteristic of the light source 10 and the specs of the scanner 1, etc.

The light source stability determination unit 23 determines whether or not the light source 10 is in a stable state, based on the light amounts detected by one line of pixels of the imaging device 12. As described above, the scanner 1 obtains white color image signals used for calculating correction values only in a case where the light source stability determination unit 23 determines that the light source 10 is in a stable state. Then, the scanner 1 applies shading correction to the image signals using the correction values. Therefore, according to the present embodiment, it is possible to prevent a decrease in the precision for image correction due to unstableness of the light source.

Modification of First Embodiment

In this modification, a plurality of pixels existing between the pixel P1 and the pixel Pb are arbitrarily selected. In a case where the difference between the signal level of the white color image signal corresponding to the light amount detected by each of the selected pixels and the signal level Wb of the white color image signal corresponding to the light amount detected by the pixel Pb is equal to or less than a threshold value, the light source stability determination unit 23 may determine that the light source 10 is in a stable state.

Further, in a case where there are equal to or more than a predetermined number of pixels between the pixel P1 and the pixel Pb whose signal levels have a difference equal to or less than a threshold value from the signal level Wb corresponding to the light amount detected by the pixel Pb, the light source stability determination unit 23 may determine that the light source 10 is in a stable state.

Second Embodiment

In the first embodiment, determination by the light source stability determination unit 23 whether the light source 10 is in a stable state or not is done by determining whether there is a distortion in the waveform of one line of white color image signals. However, the determination method of the light source stability determination unit 23 is not limited to the above. The light source stability determination method 23 may determine whether or not the light source 10 is in a stable state by obtaining a difference between signal levels of two white color image signals.

The following will explain an embodiment where the light source stability determination unit 23 of the scanner 1 determines whether or not the light source 10 is in a stable state by comparing the waveforms of two white color image signals.

Figure 7:
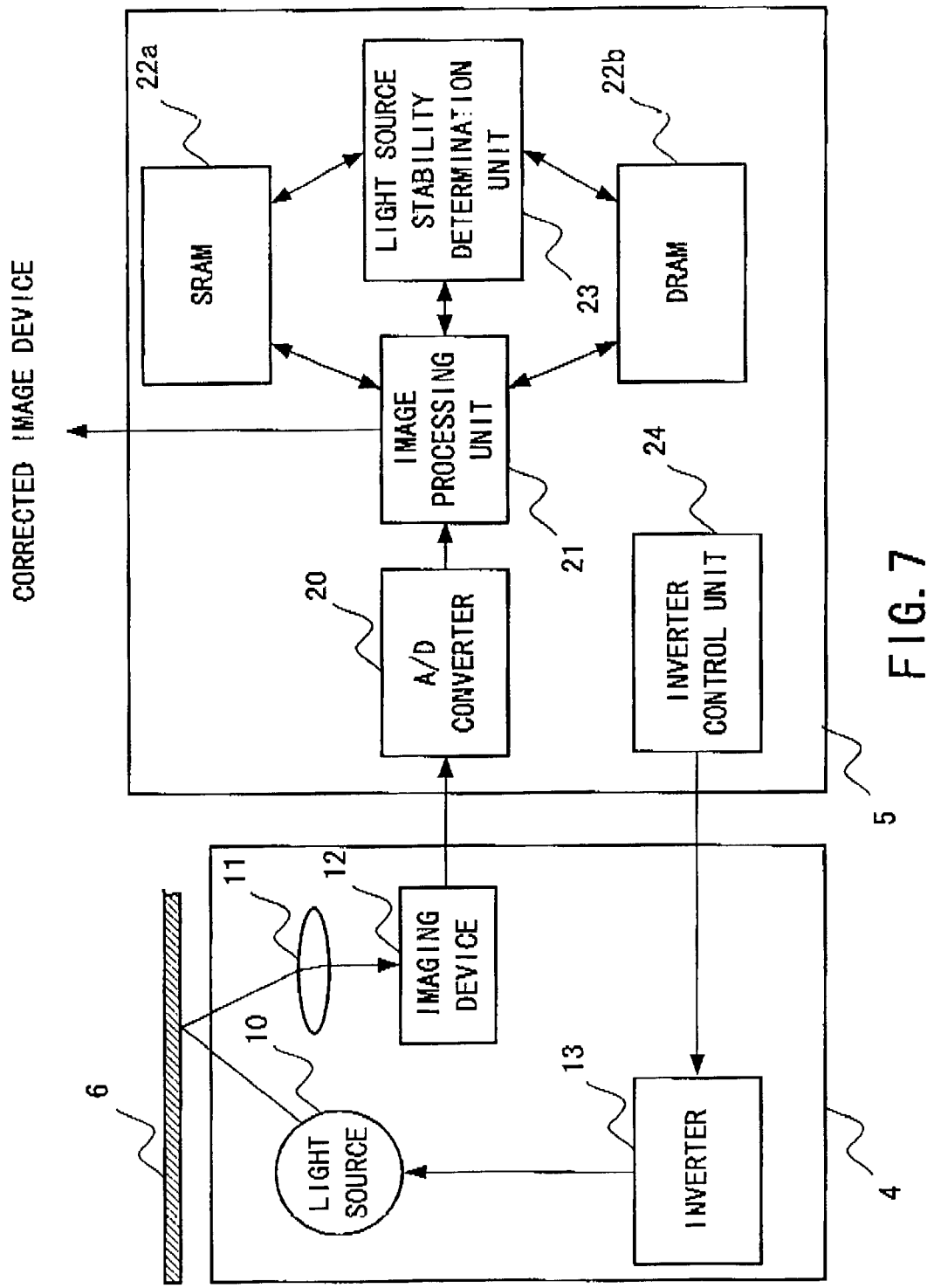
FIG. 7 is a block diagram showing a structure of a light source control circuit included in an image reading apparatus according to a second embodiment of the present invention.

In this case, the scanner controller 5 of the scanner 1 has the structure shown in FIG. 7. The scanner controller 5 shown in FIG. 7 has a SRAM 22a and a DRAM 22b instead of the waveform data memory 22. Other than the SRAM 22a and the DRAM 22b, the scanner controller 5 has the same structure as that shown in FIG. 2.

The SRAM 22a stores waveform data representing white color image signals that are obtained by scanning the reference white plate 3 at the time of the shipping of the scanner 1.

The DRAM 22b stores waveform data representing white color image signals that are obtained by scanning the reference white plate 3 after the shipping of the scanner 1.

Next, the operation of the scanner 1 having the light source stability determination unit 23 of the present embodiment will be explained. Operations of the structural elements identical to those shown in FIG. 2 are the same as the operations explained in the first embodiment, unless otherwise explained.

The power source switch of the scanner 1 is turned on at the time of, for example, shipping of the scanner 1. When a predetermined period of time passes after the light source 10 starts lighting, the imaging device 12 scans the reflection surface of the reference white plate 3, and generates white color image signals (referred to as white color image signals S1) by scanning. The imaging device 12 outputs the white color image signals S1 to the AD converter 20. The A/D converter 20 digitizes the white color image signals S1, and outputs them to the image processing unit 21. The image processing unit 21 generates waveform data representing signal levels of the white color image signals S1, and stores the waveform data in the SRAM 22a.

Since the white color image signals S1 are generated when a predetermined period of time passes after the light source 10 starts lighting, the white color image signals S1 have no substantial distortion in the waveform.

Next, the power source switch of the scanner 1 is turned on after, for example, the shipping of the scanner 1. Before obtaining a white color image signal for shading correction and before reading the image of the manuscript 6, the imaging device 12 detects light reflected on the reference white plate 3 by the respective pixels, and generates white color image signals (referred to as white color image signals S2 to distinguish from the white color image signals S1) based on the detected light amounts. The imaging device 12 outputs the white color image signals S2 to the A/D converter 20. The A/D converter 20 digitizes the white color image signals S2. The A/D converter 20 outputs the digitized white color image signals S2 to the image processing unit 21. The image processing unit 21 generates data representing the waveform of the white color image signals S2 corresponding to one line, and stores the generated data in the DRAM 22b. Then, the image processing unit 21 notifies the light source stability determination unit 23 that storing of the waveform data of the white color image signals S2 is completed.

In response to this notification, the light source stability determination unit 23 reads out the waveform data of the white color image signals S1 stored in the SRAM 22a and the waveform data of the white color image signals S2 stored in the DRAM 22b. Then, the light source stability determination unit 23 compares the two read-out waveform data pixel by pixel.

To be more specific, the light source stability determination unit 23 determines pixel by pixel whether or not the difference in the signal level between a white color image signal S1 and a white color image signal S2 is less than a predetermined threshold value.

In a case where the pixel-by-pixel difference in the signal level between a white color image signal S1 and a white color image signal S2 is less than the predetermined threshold value, the light source stability determination unit 23 determines that the light source 10 is in a stable state. On the contrary, in a case where the pixel-by-pixel difference in the signal level is equal to or greater than the predetermined threshold value, the light source stability determination unit 23 determines that the light source 10 is not in a stable state.

In this way, the light source stability determination unit 23 derives the difference in the signal level between a white color image signal S1 and a white color image signal S2 for each pixel of the imaging device 12, and determines whether or not the light source 10 is in a stable state based on the derived difference. The scanner 1 obtains white color image signals used for shading correction and reads the image of the manuscript 6 only in a case where the light source stability determination unit 23 determines that the light source 10 is in a stable state. Accordingly, the scanner 1 according to the present embodiment can obtain white color image signals for shading correction whose waveform is substantially distortion-free, by scanning the reference white plate 3 when the light source 10 is in a stable state. Since shading correction of image signals can be performed using the white color image signals having the distortion-free waveform, the scanner 1 according to the present embodiment succeeds in achieving a fine correction precision.

Modification of Second Embodiment

The light source stability determination unit 23 may obtain a difference in the signal level between a white color image signal S1 and a white color image signal S2 pixel by pixel, and add up all the obtained difference. In a case where the add-up result is less than a predetermined threshold value, the light source stability determination unit 23 may determine that the light source 10 is in a stable state.

Or, the light source stability determination unit 23 may obtain a number of pixels whose difference in the signal level between a white color image signal S1 and a white color image signal S2 is less than a predetermined threshold value. In a case where the obtained number is equal to or greater than a predetermined number, the light source stability determination unit 23 may determine that the light source 10 is in a stable state.

Third Embodiment

As explained, in the second embodiment, since the white color image signals S1 are generated when a predetermined period of time passes after the light source 10 starts lighting, the waveform representing the signal levels of the white color image signals S1 has substantially no distortion.

However, generally speaking, there are some times when the light source 10 is still unstable even when a predetermined period of time passes after it starts lighting. In this case, the waveform of the white color image signals S1 has a distortion. Even if these white color image signals S1 are used as references for determining whether or not the waveform of the white color image signals S2 has a distortion, the light source stability determination unit 23 can not make a correct determination.

Hence, it might be better that after the image processing unit 21 generates waveform data of the white color image signals S1 and stores the waveform data in the SRAM 22a, the light source stability determination unit 23 should determine whether or not there is a distortion in the waveform of the white color image signals S1 using the determination method explained in the first embodiment. Only in a case where determining that there is almost no distortion, the light source stability determination unit 23 should store the waveform data of the white color image signals S1 in the SRAM 22a. According to this method, the light source stability determination unit 23 can determine whether or not the light source 10 is in a stable state more accurately.

By combining the determination method explained in the first embodiment and the determination method explained in the second embodiment, the light source stability determination unit 23 can determine whether or not the light source 10 is in a stable state more strictly.

The present invention is not limited to the above-described embodiments, but can be applied in various ways. For example, in the above-described embodiments, the scanner 1 is employed as an example of the image reading apparatus of the present invention. However, the image reading apparatus is not limited to the scanner 1, but may be a facsimile machine, a copier, or other arbitrary apparatuses.

Specifically, the image reading apparatus may be one that employs an imaging device including a plurality of red, green, and blue pixels, such as a color scanner. If the light source stability determination unit 23 makes a determination in the manners explained in the above-described embodiments based on light amounts detected by pixels of the respective colors, it can determine whether or not the light source 10 is in a stable state.

According to the explanation of the above-described embodiments, the imaging device 12 is constituted by a one-dimensional CCD. However, the imaging device 12 is not limited to this type, but may be replaced by anything as long as it detects light amounts by respective pixels thereof and generates electric signals having signal levels corresponding to the detected light amounts.

According to the explanation of the above-described embodiments, the scanner 1 comprises a program stored in the program memory 7. However, this program may not be comprised in the scanner 1, but may be loaded to the scanner 1 from a computer which is connected to the scanner 1 via a network. Moreover, this program may be recorded on a recording medium such as a CD, etc., and may be loaded to the scanner 1 or a computer.

In the first embodiment, the light source stability determination unit 23 determines whether or not the light source 10 is in a stable state based on light amounts detected by three pixels in one line. However, the number of pixels used for determination is not limited to this, but the light source stability determination unit 23 may determine whether or not the light source 10 is in a stable state based on light amounts detected by pixels equal to or more than three.

According to the explanation of the second embodiment, the waveform data of the white color image signals Si obtained at the time of shipping is stored in the SRAM 22a. However, the present invention is not limited to this. For example, the waveform data of the white color image signals S1 may be stored in a recording medium such as a hard disk, which can store waveform data even when the scanner 1 is switched off.

Likewise, the waveform data of the white color image signals S2 may be stored in a ROM, a hard disk, or other arbitrary recording media, instead of the DRAM 22b.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2002-110914 filed on Apr. 12, 2002 and including specification, claims, drawings and summary. The disclosure of the above Japanese Patent Application is incorporated herein by reference in its entirety.

What is claimed is:

1. A light source stability determination method applied to an image reading apparatus in which an imaging device formed by pixels arranged in one line detects light reflected on a white reflection surface having a uniform reflection ratio by the respective pixels, white correction values are calculated for the respective pixels based on amounts of the detected light, said imaging device detects light reflected on a manuscript by the respective pixels and generates first electric signals having signal levels corresponding to amounts of the detected light, and the signal levels of the first electric signals generated from the respective pixels are corrected by the correction values, said method comprising:

irradiating light to said reflection surface from a light source constituted by a cold-cathode tube;

detecting light reflected on said reflection surface by the respective pixels of said imaging device;

determining whether or not a light amount obtained by the one line of pixels from said light source is within a predetermined range, based on light amounts detected by the respective elements;

starting calculation of the correction values, generation of the first electric signals, and correction of the signal levels of the first electric signals with the use of the correction values, in a case where it is determined that the light amount obtained by the one line of pixels from said light source is within the predetermined range;

generating second electric signals having signal levels corresponding to the light amounts reflected on the reflection surface and detected by the respective pixels;

generating waveform data representing the signal levels of the second electric signals corresponding to the one line of pixels;

determining whether or not there is a distortion in the waveform data corresponding to the one line of pixels; and determining that the light amount obtained by the one line of pixels from said light source is within the predetermined range, in a case where it is determined that there is no distortion in the waveform data.

2. The light source stability determination method according to claim 1, further comprising:

selecting from the one line of pixels of said imaging device, a first pixel positioned at one end of said imaging device, a second pixel positioned at the other end of said imaging device, and a third pixel positioned in the middle between the first pixel and the second pixel;

further selecting a fourth pixel between the third pixel and the first pixel that is away from the third pixel by a predetermined distance, and a fifth pixel between the third pixel and the second pixel that is away from the third pixel by the same distance as that between the third pixel and the fourth pixel;

specifying a signal level corresponding to a light amount detected by the fourth pixel and a signal level corresponding to a light amount detected by the fifth pixel from the waveform data; and determining whether or not there is a distortion in the waveform data by deriving a difference between the signal level corresponding to the light amount detected by the fourth pixel and the signal level corresponding to the light amount detected by the fifth pixel.

3. The light source stability determination method according to claim 2, further comprising determining that the light amount obtained by the one line of pixels from said light source is within the predetermined range, in a case where the difference between the signal level corresponding to the light amount detected by the fourth pixel and the signal level corresponding to the light amount detected by the fifth pixel is less than k times of the signal level corresponding to the light amount detected by the fourth or fifth pixel (k being a real number satisfying a relationship 0>k>1).

4. The light source stability determination method according to claim 2, further comprising determining that there is a distortion in the waveform data, in a case where a signal level corresponding to a light amount detected by the third pixel is larger than one of the signal levels corresponding to the light amounts detected by the fourth and fifth pixels and is smaller than the other of the signal levels corresponding to the light amounts detected by the fourth and fifth pixels.

5. The light source stability determination method according to claim 1, further comprising:

detecting light reflected on said reflection surface by the respective pixels of said imaging device when a predetermined period of time passes after said light source starts lighting, and generating third electric signals having signal levels corresponding to detected light amounts;

generating waveform data representing the signal levels of the third electric signals corresponding to the one line of pixels;

specifying signal levels of the second electric signals obtained from predetermined pixels and signal levels of the third electric signals obtained from the same predetermined pixels, respectively from the waveform data of the second electric signals and the waveform data of the third electric signals; and determining that the light amount obtained by the one line of pixels from said light source is within the predetermined range, in a case where differences between the specified signal levels of the second electric signals and the specified signal levels of the third electric signals are equal to or less than a predetermined threshold value.

6. An image reading apparatus in which an imaging device formed by pixels arranged in one line detects light reflected on a white reflection surface having a uniform reflection ratio by the respective pixels, white correction values are calculated for the respective pixels based on amounts of the detected light, said imaging device detects light reflected on a manuscript by the respective pixels and generates first electric signals having signal levels corresponding to amounts of the detected light, and the signal levels of the first electric signals generated from the respective pixels are corrected by the correction values, said apparatus comprising:

a light source which is constituted by a cold-cathode tube, and irradiates light to said reflection surface;

an imaging device which includes a plurality of pixels arranged in one line, and detects light reflected on said reflection surface by the respective pixels;

a light source stability determination unit which determines whether or not a light amount obtained by the one line of pixels from said light source is within a predetermined range, based on light amounts detected by the respective pixels; wherein in a case where said light source stability determination unit determines that the light amount obtained by the one line of pixel from said light source is within the predetermined range, calculation of the correction values, generation of the first electric signal, and correction of the first electric signals with the use of the correction values are started; and an image processing unit which calculates the correction values, and corrects the signal levels of the first electric signals obtained from the respective pixels, with the use of the calculated correction values, wherein:

said imaging device generates second electric signals having signal levels corresponding to the light amounts reflected on said reflection surface and detected by the respective pixels;

said image processing unit generates waveform data of the second electric signals corresponding to the one line of pixels; and said light source stability determination unit determines whether or not the light amount obtained from said light source is within the predetermined range, based on the waveform data corresponding to the one line of pixels.

7. The image reading apparatus according to claim 6, wherein:

when a predetermined period of time passes after said light source starts lighting, said imaging device detects light reflected on said reflection surface by the respective pixels, and generates third electric signals having signal levels corresponding to detected light amounts;

said image processing unit generates waveform data representing the signal levels of the third electric signals corresponding to the one line of pixels; and said light source stability determination unit determines that the light amount obtained by the one line of pixels from said light source is within the predetermined range, in a case where differences between signal levels of the second electric signals obtained from predetermined pixels and signal levels of the third electric signals obtained from the same predetermined pixels are determined to be equal to or less than a predetermined threshold value by referring to the waveform data of the second electric signals and the waveform data of the third electric signals.

8. The image reading apparatus according to claim 7, wherein said light source stability determination unit:

selects from the one line of pixels of said imaging device, a first pixel positioned at one end of said imaging device, a second pixel positioned at the other end of said imaging device, and a third pixel positioned in the middle between the first pixel and the second pixel in the waveform data of the third electric signals;

further selects a fourth pixel between the third pixel and the first pixel that is away from the third pixel by a predetermined distance, and a fifth pixel between the third pixel and the second pixel that is away from the third pixel by the same distance as that between the third pixel and the fourth pixel;

specifies a signal level corresponding to a light amount detected by the fourth pixel and a signal level corresponding to a light amount detected by the fifth pixel; and determines that the light amount obtained by the one line of pixels of said imaging device from said light source is within the predetermined range, in a case where a difference between the signal level corresponding to the light amount detected by the fourth pixel and the signal level corresponding to the light amount detected by the fifth pixel is less than a predetermined threshold value.

* * * * *